SELF-REFERENCED DIGITAL PM RECEIVING SYSTEM

Filed Aug. 17, 1962 2 Sheets-Sheet 1

INVENTOR.
ABRAHAM HAREL
BY
E J Norton
ATTORNEY

INVENTOR.
ABRAHAM HAREL
BY
E. J. Norton
ATTORNEY

United States Patent Office 3,156,893
Patented Nov. 10, 1964

3,156,893
SELF-REFERENCED DIGITAL PM RECEIVING SYSTEM

Abraham Harel, Trenton, N.J., assignor to Radio Corporation of America, a corporation of Delaware Filed Aug. 17, 1962, Ser. No. 217,702
10 Claims. (Cl. 340—146.1)

This invention relates to systems for recovering information carried by a binary phase modulated signal, and, particularly, to an improved decoding system for recovering information carried by a self-referenced, binary, phase modulated signal while simultaneously and continuously providing an indication of errors in the received signal.

Binary phase modulation is defined as a type of data transmission in which each information-bit or signal interval includes at substantially the center of the information-bit a transition between two states such as, for example, two voltage levels or two frequencies. There is no third state. The direction or phase of the transition carries the bit information. A transition from one state to the second state signifies a binary one, and, conversely, a transition from the second state to the first state signifies a binary zero. Transitions between succeeding, similar information-bits carry no information and are ignored as concerns the information content of the binary phase modulated signal.

In order to recover the information from a binary phase modulated signal, a timing reference is provided. Decoding systems have been proposed in which a timing reference produced upon the generation of the data information signal is transmitted over a second, parallel channel. In addition to being wasteful of the signal capacity of the transmission facility, there are many applications where a second, parallel channel for the timing reference is not available and/or practical. The transmission of the data signal over a telephone line, for example, provides only a single channel for the data information signal. Where storage in the form of a magnetic tape or magnetic drum is involved in the transmission of the data information signal, the provision of a separate timing reference uses memory capacity which can not always be spared.

Decoding systems have also been proposed in which the timing reference is produced at the receiving end either from the received binary phase modulated signal itself or from one or more free-running high-precision clock generators which are synchronized in some manner with a similar clock generator at the transmitting end of the system. Such systems tend to be quite costly and subject to precise tolerance requirements difficult to achieve and maintain in operation. In such systems, the message length is sharply limited by the timing inaccuracy which cumulatively increases with each additional bit. Efforts to provide with such systems error detection in the operation of a practical data transmission path have involved the use of complicated circuitry with the accompanying problems of high cost and precise tolerances, in addition to the problem of size due to the number of components required.

It is an object of the invention to provide an improved circuit arrangement simpler both in construction and in operation than arrangements previously available for recovering the information carried by a binary phase modulated signal.

Another object is to provide an improved and simplified circuit arrangement for recovering the information carried by a binary phase modulated signal while simultaneously and continuously providing error-checking of each information-bit in the received signal.

A further object is to provide an improved decoding and error detecting system of wide tolerances and reduced number of components for use in a self-referenced, digital phase modulation receiving system.

The above objects are accomplished according to one embodiment of the invention by a circuit arrangement which is responsive to a binary phase modulated signal pattern to provide at one output the recovered information content of the received signal and at a separate output an indication upon the reception of an erroneous information-bit. The binary phase modulated signal includes messages each composed of a plurality of information-bits. The information bits are characterized by a transition between two states substantially at the center of the bit-time, one direction or phase of the transition representing a binary one and the other direction representing a binary zero. Consecutive messages, which may be of arbitrary length, are separated by a separation-code interval. The separation code consists only of the two states present in the information-bits and uniquely extends in the time domain so that any other extension in the time domain constitutes an error in the received signal. The separation code interval is not only distinguishable from the information-bits but also provides a unique reference point for the correct timing-derivation of the message which follows.

A timing circuit is responsive to the separation code interval and to the succeeding information-bits to produce a reference signal timed according to each mid-bit transition. A control circuit is responsive to the separation code interval to produce a second reference signal. The first reference signal, the second reference signal and the received binary phase modulated signal are compared. An output pulse is produced for each received information-bit of one type, for example, binary one. The reception of each information-bit of the other type, binary zero, is indicated by the absence of an output pulse during a (derived) reference (clock) period.

Error-checking is performed each bit time by comparing the first reference signal, the second reference signal and the received binary phase modulated signal to determine the presence or absence of each mid-bit transition. The absence of a mid-bit transition indicates that a received information bit is in error, and an output pulse is generated for application to alarm or other monitoring equipment. The decoding and error detecting system of the invention is of a simple construction, permitting wide tolerances in its operation.

A more detailed description of the invention will now be given in connection with the accompanying drawing, wherein.

Figures 1, 3:
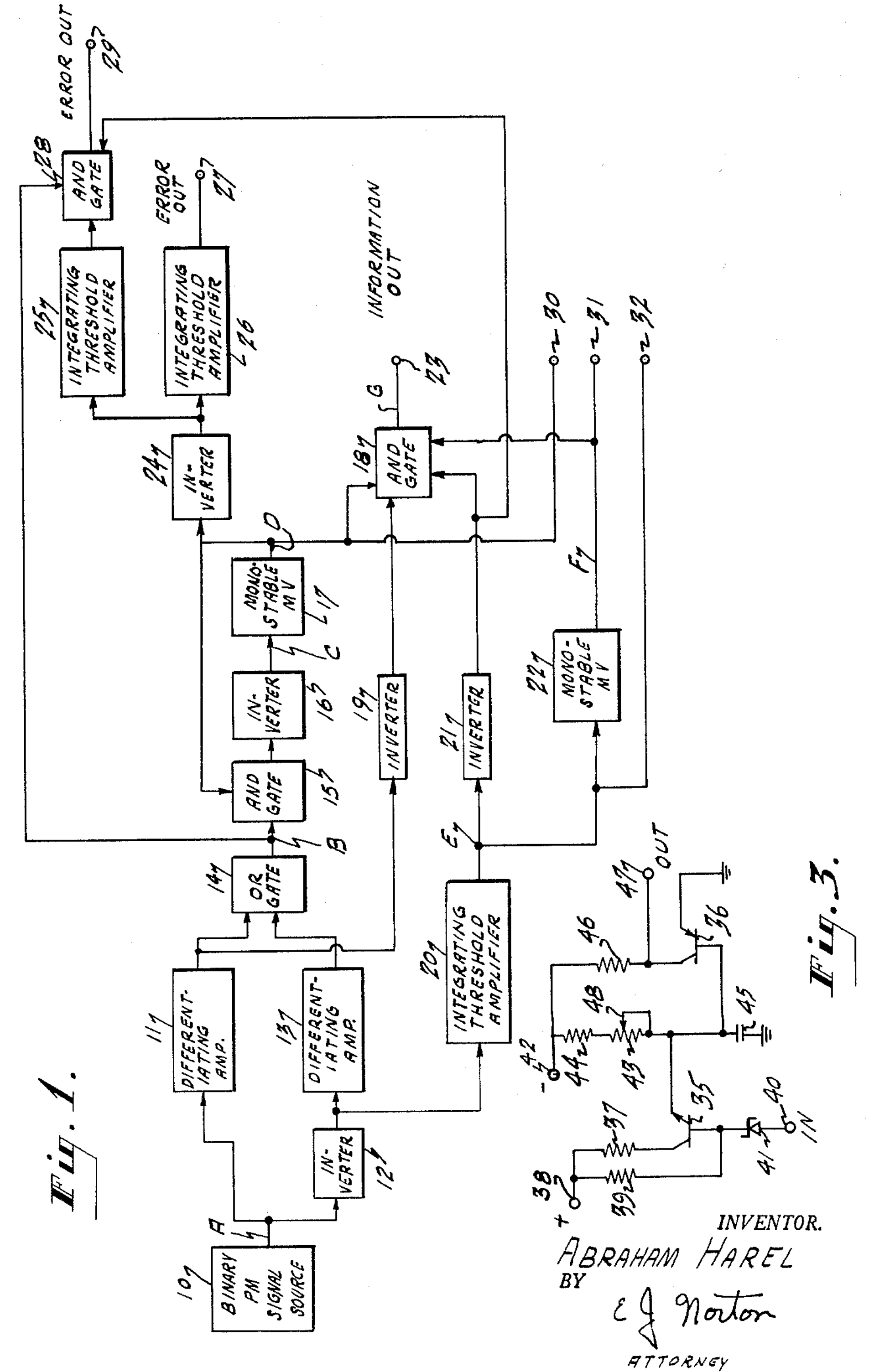
FIGURE 1 is a block diagram of one embodiment of the invention.
FIGURE 3 is a circuit diagram of an integrating-threshold amplifier as may be used in the arrangement of FIGURE 1, by way of example.

In the interest of clarity, all ground symbols and bias voltages are omitted in FIGURE 1 of the drawing which depicts the signal paths only. It may be assumed that a ground return and bias voltages are associated with each of the blocks in FIGURE 1 where necessary.

Figure 2:
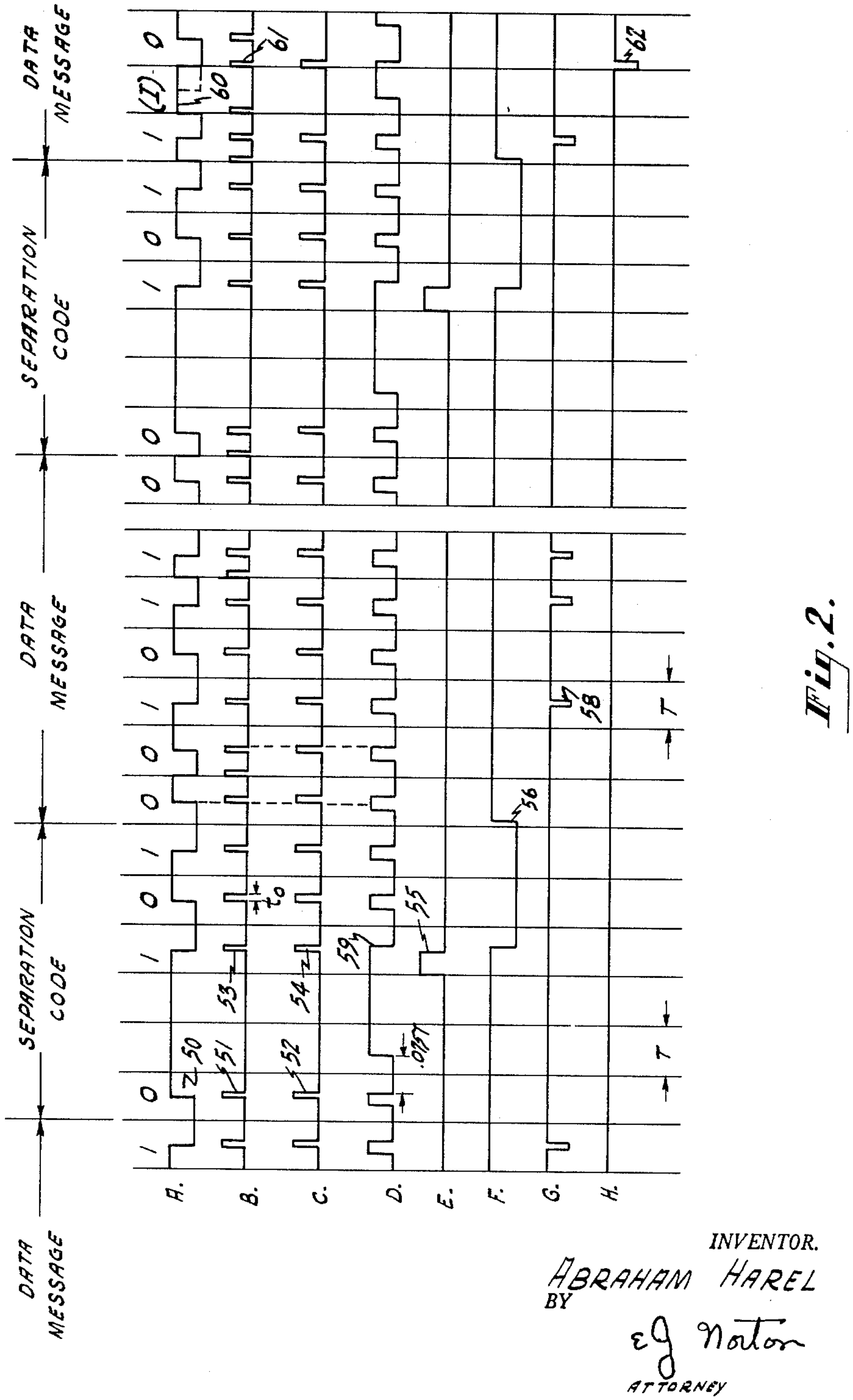
FIGURE 2 is a series of waveforms useful in describing the operation of the block diagram given in FIGURE 1.

Before considering the embodiment of the invention shown in FIGURE 1, reference is made to the topmost waveform A in FIGURE 2 which represents one example of a binary phase modulated signal pattern to which the decoding and error detecting circuit of FIGURE 1 is responsive. The signal is divisible into equal time intervals each having a duration T, and is at any given moment in time in either one of two states, ideally, there being no third state.

The message portions of the signal, which are labelled data message, include a plurality of information-bits, the data messages being of an arbitrary length. Each information-bit includes a transition between the two states at substantially the middle of the bit-time T. The information-bits including a transition from the low state to the high state are arbitrarily designated as binary zero, the information-bits including a transition from the high state to the low state being designated as binary one. The direction or phase of the transition at the center of each bit therefore determines the nature of the information-bit.

The messages included in the signal, waveform A, are separated by a separation code interval. The separation code intervals each consist of a binary zero bit, two bit intervals in the high state, a binary one bit, a binary zero bit and a binary one bit. The separation code intervals, which include only the two states present in the data messages, are characterized in part by a signal condition which extends in the time domain in the high state for a duration equal to three times the normal bit interval or 3T.

A signal source for supplying the binary phase modulated signal shown in waveform A is shown in FIGURE 1 as binary PM signal source 10. The signal source 10 may include any known means for generating the signal. For example, a phase modulated tone generator may be used. Arrangements of gates and bistable devices are also commonly employed to generate a binary phase modulated signal. The signal source 10 may include a radio path, a land line as, for example, a telephone line, or any other transmission path. A magnetic tape, a magnetic drum or other storage means with the attendant read-in and read-out circuitry may form a part of the signal source 10.

The binary phase modulated signal supplied by the source is fed over a first path to a differentiating and shaping amplifier 11. The signal is also fed through an inverter 12 to a second differentiating and shaping amplifier 13. The outputs of amplifiers 11 and 13 are coupled over separate paths to an OR gate 14. The output of the OR gate 14 is coupled through an AND gate 15 and an inverter 16 to a monostable multivibrator 17. The output of multivibrator 17 is fed back to form a second input to the AND gate 15. The output of the multivibrator 17 is also applied to an AND gate 18.

The output of the amplifier 11 is coupled through an inverter 19 to a second input of the AND gate 18. The inverted signal appearing at the output of inverter 12 is applied to an integrating-threshold amplifier 20. The output of the amplifier 20 is coupled through an inverter 21 to a third input of the AND gate 18. The output of a monostable multivibrator 22, which is responsive to the output of the amplifier 20, is coupled to a fourth input of the AND gate 18. The output of the AND gate 18 which is determined according to the information content of the signal received from source 10 appears at the output terminal 23.

The output of the monostable multivibrator 17 is also coupled through an inverter 24 to the input of integrating-threshold amplifiers 25 and 26. The output of the amplifier 26 is coupled to an output terminal 27 to indicate the detection of one type of error in the signal supplied by source 10. The output of the amplifier 25 is coupled to one input of an AND gate 28. The output of the OR gate 14 is coupled to a second input of the AND gate 28, the output of the inverter 21 being coupled to a third input of the AND gate 28. The output of the AND gate 28 is coupled to an output terminal 29 to indicate the detection of a second type of error in the signal received from the source 10.

As will become evident from the following description of a typical operation of the decoding and error detecting circuit of FIGURE 1, the differentiating amplifiers 11 and 13, the OR gate 14, the AND gates 15, 18 and 28, the inverters 12, 16, 19, 21 and 24, and the monostable multivibrators 17 and 22 are all of known suitable design. The stages may be constructed using crystal diodes, transistors, vacuum tubes or other circuit elements in a known manner. FIGURE 3 is a circuit diagram of one example of an integrating-threshold amplifier which may be used for the amplifiers 20, 25 and 26 of FIGURE 1.

As shown in FIGURE 3, the integrating-threshold amplifier includes an NPN junction transistor 35 and a PNP junction transistor 36. The collector electrode of transistor 35 is connected through a resistor 37 to the positive terminal 38 of a source of unidirectional potential. The base electrode of transistor 35 is connected to the positive terminal 38 through a resistor 39 larger in value than the resistor 37. An input terminal 40 is connected through a Zener diode 41 to the base electrode of the transistor 35, the diode 41 being poled for current flow in the direction of the arrow. The emitter electrode of transistor 35 is connected to the negative terminal 42 of a source of unidirectional potential through a variable resistor 43 and a resistor 44. A capacitor 45 is connected between the emitter electrode of transistor 35 and a point of reference potential or ground. The base electrode of transistor 36 is connected to the junction of the capacitor 45 and the variable resistor 43. The collector electrode of transistor 36 is connected to the negative terminal 42 through a resistor 46, and the emitter electrode of transistor 36 is connected directly to the point of reference potential or ground. An output terminal 47 is connected to the collector of transistor 36.

Assuming that a positive-going input is applied to terminal 40 and that power is applied to terminals 38 and 42, the emitter electrode of transistor 35 is biased in the forward direction with respect to the base electrode, and transistor 35 conducts. The resulting current flow through resistors 44 and 43 causes capacitor 45 to charge with the top plate of the capacitor 45 becoming more positive than the bottom plate. Since a low impedance is presented at the emitter electrode of the transistor 35, capacitor 45 will charge rapidly in the positive direction. The charged condition of the capacitor 45 causes the emitter electrode of transistor 36 to be biased in the reverse direction with respect to the base electrode of the transistor 36, and transistor 36 is non-conducting. A negative-going output appears at terminal 47.

Upon the input to terminal 40 going negative to a sufficient level to cause a break-down in the current conducting characteristics of the Zener diode 41, the base electrode of transistor 35 becomes negative with respect to the emitter electrode. Transistor 35 becomes non-conducting, the Zener diode 41 providing a rapid switching action. At this time, both transistors 35 and 36 are non-conducting. The series circuit including resistor 44, variable resistor 43 and capacitor 45 is isolated from both the input terminal 40 and the output terminal 47. Capacitor 45 discharges through the large resistance of resistors 43 and 44 at a rate determined by the setting of the variable tap 48 on the resistor 43 and the value of resistor 44. Assuming that the input to terminal 40 does not become positive-going causing transistor 35 to conduct before the positive charge drains off of the capacitor 45, capacitor 45 will charge in the opposite or negative direction. The base electrode of transistor 36 becomes negative with respect to the emitter electrode. Transistor 36 conducts, and a positive-going signal is applied from the collector electrode of transistor 36 to the output terminal 47. The output at terminal 47 remains positive-going for as long as the input to terminal 40 remains negative-going. Upon the input to terminal 40 becoming positive-going, transistor 35 conducts and capacitor 45 is again charged rapidly in a positive direction. Transistor 36 becomes non-conducting, and the output at terminal 47 becomes negative-going.

The integrating-threshold amplifier thus provides a positive-going output for a negative-going input. The positive-going output terminates upon the termination of the negative-going input. A positive-going output is produced, however, only if the input is negative-going for a time duration determined according to the time constant of the resistance-capacitance circuit including resistors 43 and 44 and capacitor 45. If the input at terminal 40 should become positive-going before the charge on capacitor 45 has become sufficiently negative to cause transistor 36 to conduct, the current conduction of transistor 35 causes capacitor 45 to be rapidly recharged in the positive direction. Transistor 36 remains non-conducting, and the output at terminal 47 remains negative-going. By determining the value of the capacitor 45 and resistors 43 and 44, the integrating threshold amplifier can be made to produce a transition in its output condition only after a transition in the state of the input to the amplifier has persisted for a given time period. The integrating-threshold amplifier thus acts to sense a prolonged signal condition and to provide an output when the signal condition exceeds a predetermined time interval.

In the operation of the decoding and error detecting circuit of FIGURE 1 in response to the binary phase modulated signal shown in waveform A of FIGURE 2, the binary phase modulated signal is fed directly from the signal source 10 to the differentiating and shaping amplifier 11. The binary phase modulated signal is also inverted by the inverter 12 and fed to the differentiating and shaping amplifier 13. Amplifiers 11 and 13 are each responsive only to negative-going transitions to produce negative-going output pulses. Differentiating amplifier 11 thus produces a negative-going output pulse for each transition from the high state to the low state in the binary phase modulated signal. Differentiating amplifier 13 operating in response to the inversion of the signal produces a negative-going pulse for each transition from the low state to the high state in the binary phase modulated signal.

The negative-going pulses produced by the amplifiers 11 and 13 are fed to the OR gate 14. The output of the OR gate 14 is positive-going when, and only when, either one of the negative-going pulse inputs from amplifiers 11 and 13 is present. A train of positive-going pulses of substantially constant amplitude and width $t_0$ is produced at the output of the OR gate 14, the pulse train including a positive-going pulse for each transition in the received signal, waveform A, occurring at the middle of the bits and between similar bits. The series of pulses appearing at the output of the OR gate 14 is shown in waveform B of FIGURE 2.

The pulse train B is applied to the AND gate 15. The output of the monostable multivibrator 17 fed back to the second input of AND gate 15 is normally positive-going. In this condition, AND gate 15 is enabled and produces a negative-going output pulse upon the reception of a positive-going pulse in the pulse train from OR gate 14. The negative-going pulses appearing at the output of the AND gate 15 are applied to the inverter 16 which produces a train of positive-going pulses, shown in waveform C of FIGURE 2, at the input to the monostable multivibrator 17. Monostable multivibrator 17 is triggered into its unstable state in response to negative-going transitions only. Thus, the inverter 16 introduces a deliberate delay of a pulse width $t_0$ between the operating time of the AND gate 15 and the triggering instant of the monostable multivibrator 17. Upon being triggered into its unstable state, the output of the monostable multivibrator 17 becomes negative-going or low and remains in this condition for a fixed time duration determined, for example, by the time constant of an RC network. The time constant is determined so that the monostable multivibrator 17 remains in its unstable state for a time period equal to three-quarters of the bit-time in the binary phase modulated signal or 0.75T. The recovery time during which the monostable multivibrator 17 automatically returns from its unstable state to its stable state should be sufficiently short to permit the monostable multivibrator 17 to be triggered at least every bit-time. During the period in which monostable multivibrator 17 is in its unstable state, AND gate 15 is held non-responsive to any pulses applied thereto from the OR gate 14. As a result of the above operation, the output of the monostable multivibrator 17, shown in waveform D of FIGURE 2, is a timing reference which can be used to derive the information content from the binary phase modulated signal and to provide an error-checking of the received signal.

It is essential to the proper operation of the decoding and error detecting circuit that the timing reference produced by the monostable multivibrator 17 be in the proper phase. Correct phasing of the timing reference is achieved by the use of the separation code forming a part of the binary phase modulated signal. It will be assumed that the next bit interval in the binary phase modulated signal is the first bit interval 50, binary zero, in the separation code. Since the mid-bit transition is from the low state to the high state, differentiating amplifier 13 is responsive to the negative-going transition in the inversion of the signal applied thereto to apply a negative-going pulse to the OR gate 14. A positive-going pulse 51 shown in waveform B of FIGURE 2 appears at the output of the OR gate 14. Monostable multivibrator 17 is at this time in its stable or normal state, enabling AND gate 15. A negative-going pulse is fed to the inverter 16.

The trailing edge of the positive-going pulse 52 appearing at the output of the inverter 16 and shown in waveform C of FIGURE 2 triggers the monostable multivibrator 17 into its unstable state. As shown in waveform D of FIGURE 2, the output of the monostable multivibrator 17 is positive-going during the time that the mid-bit transition occurs in the received binary phase modulated signal and the monostable multivibrator 17 is in its stable state. Upon being triggered into its unstable state, the output of the monostable multivibrator 17 becomes negative-going and remains in this state for three-quarters of the bit-time or 0.75T, after which the multivibrator output again becomes positive-going upon multivibrator 17 returning to its stable state. During the time 0.75T that monostable multivibrator 17 is in its unstable state, the negative-going signal condition fed back to the AND gate 15 holds AND gate non-responsive to any pulses applied thereto from the OR gate 14.

The second and third bit intervals of the separation code are characterized by a continuous high state of the binary phase modulated signal. No transitions take place in the signal, and monostable multivibrator 17 remains in its stable state. The fourth bit in the separation code is a binary one including at its mid-point a transition from the high state to the low state in the signal. Differentiating amplifier 11 is responsive to the negative-going transition in the signal to apply a negative-going pulse to the OR gate 14. The positive-going pulse 53, waveform B, appearing at the output of the OR gate 14 is passed through the AND gate 15 and the monostable multivibrator 17 is triggered into its unstable state by the trailing edge of the positive-going pulse 54, waveform C, produced by the inverter 16, thus yielding a negative-going transition 59 in its output waveform D. The operation of monostable multivibrator 17 in response to the fifth bit, binary zero, and the sixth bit, binary one, in the separation code is as described. In each case the output of the monostable multivibrator 17 is positive-going or high at the time of the transition at the middle of the bits, the multivibrator output becoming negative-going at the time $t_0$ following the mid-bit transition in the binary phase modulated signal and remaining in this state for the period 0.75T. The transitions in the bits comprising the separation code occur only at the center of the bit-times. The timing reference produced at the output of the monostable multivibrator 17 is in the manner described accurately phased according to the mid-bit transitions. Should transition 59 fail to appear at the right time, an error signal will be produced during the fifth or the sixth bit-time of the separation code, as explained below, thus assuring proper phasing of the derived timing reference.

The timing reference, waveform D, is applied to one input of the AND gate 18. The negative-going pulses appearing at the output of the differentiating amplifier 11 are converted into positive-going pulses by the inverter 19 and fed to a second input of the AND gate 18. The undifferentiated, inverted binary phase modulated signal, waveform A, appearing at the output of the inverter 12 is fed to the integrating-threshold amplifier 20. The integrating-threshold amplifier 20, which may be constructed in the manner illustrated in FIGURE 3, integrates negative-going levels only, and produces a positive-going output after the negative-going level has been present for a duration exceeding two and one-half times the bit interval or 2.50T. The amplifier 20, therefore, does not respond to the individual bit intervals including a mid-bit transition but does respond to the extended portion of the separation code which is three bit intervals long or 3T. As shown in waveform E of FIGURE 2, the output of the amplifier 20 is a positive-going pulse 55 beginning at the center of the separation code and ending with the next transition which occurs at the center of the fourth bit interval, a binary one, in the separation code.

The positive-going pulse 55, waveform E, is converted into a negative-going pulse by the inverter 21 and fed to a third input of the AND gate 18. The monostable multivibrator 22 is triggered into its unstable state by the trailing edge of the pulse 55 produced by the amplifier 20. The monostable multivibrator 22 remains in its unstable state for a time period equal to two and one-half times the bit interval T or 2.50T, producing the negative-going pulse 56 shown in waveform F of FIGURE 2. The negative-going pulse 56, waveform F, produced at the output of the monostable multivibrator 22 is fed to a fourth input of the AND gate 18.

AND gate 18 is of the type wich produces a negative-going or low output when all four inputs are simultaneously positive-going or high. The operation of the AND gate 18 in response to the reception of the separation code interval in the binary phase modulated signal supplied by the signal source 10 can be seen from a comparison of the waveforms A through F in FIGURE 2. Differentiating amplifier 11 produces a negative-going output pulse in response to a transition from the high to the low state in the binary phase modulated signal, the output of the amplifier 11 in the absence of such a transition being positive-going or high. Differentiating amplifier 13 produces in response to the inversion of the binary phase modulating signal a negative-going output pulse for each transition from the low state to the high state. Upon the reception of the first bit interval of the separation code which is a binary zero, a negative-going pulse is produced by the differentiating amplifier 13 which serves to trigger the monostable multivibrator 17 in the manner previously described for pulses from differential amplifier 11. While the inputs to the AND gate 18 from the monostable multivibrators 17, 22 and the inverter 21 are positive-going at the time of the transition in the received binary zero bit interval, the input to the AND gate 18 from the inverter 19 remains negative-going since no output pulse is produced by the differentiating amplifier 11, and AND gate 18 is held non-responsive to the inputs applied thereto and no output pulse appears at the output terminal 23. Since the data messages in the phase modulated signal are of an arbitrary length, a binary zero is transmitted during the first bit interval of the separation code so that no output information pulse is produced, thereby avoiding the need for additional circuitry to block the production of an output pulse during the separation code interval and before the separation code interval is recognized.

No transitions occur during the next two bit intervals of the separation code, and the input to the AND gate 18 from the inverter 19 continues to be negative-going or low. No output pulses are then produced by the AND gate 18. Upon the fourth bit interval of the separation code, a binary one is received, differentiating amplifier 11 produces a negative-going output pulse in response to the mid-bit transition from the high to the low state in the binary phase modulated signal. The input to the AND gate 18 from the monostable multivibrators 17 and 22 are positive-going. However, as shown in waveform E of FIGURE 2, the input to the AND gate 18 from the inverter 21 is now negative-going. AND gate 18 is held non-responsive to the inputs applied thereto. During the fifth bit, a binary zero, and the sixth bit, a binary one, in the separation code, the input to the AND gate 18 from the monostable multivibrator 22 is negative-going as shown in waveform F of FIGURE 2. Again no output pulses are produced by the AND gate 18. AND gate 18, is therefore, inhibited from producing any output pulses during the separation code interval in the binary phase modulated signal, regardless of the nature of the bit intervals in the separation code. The reception of the separation code serves to mark the end of the previous message and the start of the next message such that its information bits can be properly identified in their sequence, as well as assure proper phasing of the timing reference appearing at the output of the monostable multivibrator 17 to the mid-bit transitions occurring in the separation code, there being no information content in the separation code and, therefore, no output from the AND gate 18.

Upon the conclusion of the separation code interval, the inputs to the AND gate 18 from the inverter 21 and the monostable multivibrator 22 are both positive-going and remain positive-going throughout the reception of the following data message. The first bit of the data message following the separation code interval is shown in waveform A of FIGURE 2 as a binary zero. Differentiating amplifier 13 produces a negative-going pulse in response to the mid-bit transition, causing monostable multivibrator 17 to be triggered into its unstable state at a time $t_0$ following the transition. Since the input to the AND gate 18 from the inverter 21 is at this time negative-going, the reception of the binary zero is indicated at the output terminal 23 by the absence of an output pulse.

Since the next bit in the data message is also a binary zero, a transition takes place between the similar bits and a negative-going output pulse is produced by the differentiating amplifier 11. A positive-going pulse 57, waveform B in FIGURE 2, appears at the output of the OR gate 14. At the time of the pulse 57, AND gate 15 is held non-responsive by the negative-going output of the monostable multivibrator 17. As shown in waveform C of FIGURE 2, no pulse is produced at the output of the inverter 16. The negative-going pulse produced by the differentiating amplifier 11 is applied as a positive-going pulse from the inverter 19 to the AND gate 18. However, as may be seen by comparing waveforms A, B and D in FIGURE 2, the input to the AND gate 18 from the monostable multivibrator 17 is negative-going at this time, blocking the production of an output pulse by the AND gate 18.

When the mid-bit transition of the second binary zero is received, the AND gate 18 is again blocked from producing an output pulse by the negative-going or low input to the AND gate 18 from the inverter 19 whose input is positive-going (high) due to an absence of a negative-going transition at the input of the differentiating amplifier 11, the absence of an output pulse at terminal 23 indicating the reception of the binary zero. The third bit of the data message is shown in waveform A of FIGURE 2 as a binary one with a mid-bit transition from the high to the low state. The input to the AND gate 18 from the differentiating amplifier 11 and inverter 19 becomes positive-going. The timing reference applied to the AND gate 18 from the monostable multivibrator 17, as well as the inputs to the AND gate 18 from the inverter 21 and the monostable multivibrator 22, are all positive-going at this time. AND gate 18 produces a negative-going output pulse 58 at the terminal 23, indicating the reception of a binary one, as shown in waveform G of FIGURE 2.

The operation of the decoding circuit in response to the reception of succeeding bits in the data message will be similar to that described. At the time a transistion between similar bits is received whether binary ones or binary zeros, the input to the AND gate 18 from the monostable multivibrator 17 is negative-going and AND gate 18 is disabled. No output pulse is produced. At the time of the mid-bit transition in binary zero bits, the input to the AND gate 18 from the differentiating amplifier 11 and inverter 19 is negative-going. No output pulse is produced by the AND gate 18. When the mid-bit transition of a binary one bit is received, all inputs to the AND gate 18 are positive-going and an output pulse is produced at terminal 23. A pulse train is produced at output terminal 23 including a pulse for each binary one in the data message. The presence or absence of such a pulse during each bit interval T is determined in relationship to the timing reference pulses which are derived from the incoming signal by this circuit concurrently with the decoding of the information-bits.

The timing reference appearing at the output of the monostable multivibrator 17 is shown as being applied to an output terminal 30 and is depicted in waveform D of FIGURE 2. An output terminal 31 is connected to the output of monostable multivibrator 22, and an output terminal 32 is connected to the output of the integrating-threshold amplifier 20. Since the signals appearing at output terminals 30, 31 and 32 are timed according to the binary phase modulated signal from which the pulse information at terminal 23 is derived, one or more of the signals at terminals 30, 31 and 32 may be used to identify the information pulses with respect to their position in the message, as well as to control timing, sequencing, gating or other logic in the equipment to which the information pulse train at terminal 23 is applied. Whether or not an output is actually taken from the terminals 30, 31 and 32 depends on the particular requirements of the overall application in which the invention is employed.

Error-checking of the received binary phase modulated signal is continuously performed. There are two distinct types of errors which can occur in the binary phase modulated signal. One type of error is due to momentary noise, resulting in a shift of a mid-bit transition to the edge of that bit-time. While this is a momentary error, it can result in erroneous reading of the remainder of the data message by shifting the timing reference out of phase. The second type of error is persistent noise due, for example, to fading or a temporary or permanent breakdown in the transmission path carrying the binary phase modulated signal. This type of error causes the binary phase modulated signal to remain in one of the two states for many bit-times, resulting in a long absence of transitions. In addition to the fact that there is an absence of information, the persistent error can also cause an erroneous reading of the remainder of the data message, when renewed, by shifting the phase of the timing reference. Both types of errors are detected by the system of FIGURE 1.

The timing reference appearing at the output of the monostable multivibrator 17 is fed through the inverter 24 to the inputs of the integrating-threshold amplifiers 25 and 26 which may both be constructed in the manner illustrated in FIGURE 3. When the monostable multivibrator 17 is in its stable state and its output is positive-going, the input to the integrating-threshold amplifiers 25 and 26 is negative-going. When the monostable multivibrator 17 is in its unstable state, the input to the integrating-threshold amplifiers 25 and 26 is positive-going. The amplifier 26 has a time constant equal to three and one-quarter times the bit interval T or 3.25T, and normally provides a steady negative-going output at terminal 27. If transitions are absent from the received binary phase modulated signal for a duration equal to the time constant 0.75T of the monostable multivibrator 17 plus the time constant 3.25T of the integrating-threshold amplifier 26 or 4.00T, the output of the integrating-threshold amplifier 26 becomes positive-going. The output of the integrating-threshold amplifier 26 at terminal 27 remains positive-going to provide a persistent error signal until the arrival of the next transition in the binary phase modulated signal. Upon the appearance of the transition, monostable multivibrator 17 is triggered into its unstable state. The resulting positive-going input to the integrating-threshold amplifier 26 causes the output of the amplifier 26 to again become negative-going.

The integrating-threshold amplifier 25 has a time constant equal to one-half of the bit interval T or 0.50T. Should a mid-bit transition in the received phase modulated signal be absent so that the monostable multivibrator 17 remains in its stable state for a period longer than one-half of a bit interval T, the output of the integrating-threshold amplifier 25 applied to the AND gate 28 becomes positive-going. The output of the integrating-threshold amplifier 25 remains positive-going until the monostable multivibrator 17 is triggered into its unstable state following by the period $t_0$ to the arrival of the next transition in the binary phase modulated signal. Assuming that the other two inputs to the AND gate 28 are also positive-going, the positive-going input to the AND gate 28 from the integrating-threshold amplifier 25 produces a momentary, negative-going output at the terminal 29, indicating the absence of the mid-bit transition.

One example of a case where the mid-bit transition is shifted to the end of the bit interval is shown in waveform A of FIGURE 2. A bit interval 60 labelled (I) is shown. As indicated by the dotted line, a binary one bit was intended so that a transition from the high state to the low state should have taken place at the center of the bit. Since no transition took place, no positive-going pulses appear at the outputs of the OR gate 14 and the inverter 16 as indicated in waveforms B and C of FIGURE 2. As shown in waveform D of FIGURE 2, the monostable multivibrator 17 remains in its stable state until after the next transition at the end of the bit interval 60. Since the monostable multivibrator 17 has remained in its stable state for a period longer than one-half of a bit interval or 0.50T, the output of the integrating-threshold amplifier 25 becomes positive-going.

At the time of the transition occurring at the end of the bit interval 60, the positive-going pulse 61 shown in waveform B is fed from the output of the OR gate 14 to the second input of the AND gate 28. The output of the integrating-threshold amplifier 20 is negative-going at this time, as indicated in waveform E, and the third input to the AND gate 28 from the inverter 21 is also positive-going. AND gate 28 produces a negative-going output pulse 62 shown in waveform H of FIGURE 2, indicating the absence of the mid-bit transition and the momentary error.

Since no transitions occur during the extended portion of the separation code in which the binary phase modulated signal is in the high state, the output of the OR gate 14 remains negative-going. AND gate 28 is disabled by the negative-going input from OR gate 14 and no output pulses appear at terminal 29. The inverted output of the integrating-threshold amplifier 20 serves to prevent the AND gate 28 from producing an output pulse upon the arrival of the mid-bit transition in the first binary one bit following the extended portion of the separation code. Since the integrating-threshold amplifier 25 provides a positive-going output at the time of this transition, the presence of the positive-going pulse at the output of the OR gate 14 produced from the transition would cause AND gate 28 to produce a negative-going output pulse at terminal 29. The output pulse 55, waveform E, appearing at the output of the integrating-threshold amplifier 20 causes the input to the AND gate 28 from the inverter 21 to be negative-going at the time of the transition, thus inhibiting the AND gate 28 and preventing an erroneous error indication at terminal 29.

Momentary errors due to a mid-bit transition shifting one-half of a bit-time can cause the binary phase modulated signal to erroneously remain in a single state for a duration equal to one bit interval T, one and one-half times the bit interval T, 1.5T, or, at most, twice the bit interval T, 2T. The extended portion of the separation code to be distinguishable from such a momentary error must therefore be longer than 2T. In order to allow for practical timing tolerances, the length of the extended portion is 3T. By following the extended portion with a sequency of binary one, binary zero and binary one, there are no transitions between these bits. Should a momentary error occur at the end of the extended portion of the separation code interval, shortening the extended portion to a length of 2T or 2.5T or lengthening the extended portion to 3.5T, or 4.0T, the error is indicated by the appearance of a negative-going pulse at the terminal 29. Proper initial phasing of the timing reference produced at the output of the monostable multivibrator 17 to the mid-bit transitions is thus assured.

A continuous error-checking of the received binary phase modulated signal is thus performed. The absence of a mid-bit transition during either the separation code interval or a data message due to a momentary error is at the arrival of the next transition indicated by the appearance of a negative-going pulse at terminal 29. The existence of a persistent error causing the binary phase modulated signal to remain in one state for a duration longer than 4T is indicated by the appearance of a positive-going output at terminal 27.

The arrangement permits the selection of time constants which allow for wide tolerances in its operation. Assuming a uniform and cumulative timing tolerance, proper operation is assured as long as the overall timing tolerance in the arrangement is smaller than ±20 percent. Such a timing tolerance assists the proper operation to be readily established and maintained.

What is claimed is:

1. A system for decoding a digital signal including a serial train of binary signal bits in which each one type of signal bit is in a first state for the first half of its bit interval and in a second state for the second half of its bit interval while each zero type of signal bit is in the second state for the first half of its bit interval and in the first state for the second half of its bit interval, said binary signal bits being arranged in groups of an arbitrary length with succeeding groups being separated by a separation code having an interval including a uniquely extending portion during which said digital signal remains in one of said states, comprising, in combination, means responsive to said digital signal to produce a first reference signal phased according to the mid-bit transitions in said binary signal bits, means responsive to said separation code to produce a second reference signal, and means for comparing said first reference signal, said second reference signal, and said digital signal to produce an output pulse train in which the reception of each of said one type of signal bits in said groups is indicated by a pulse and the reception of each of said zero type of signal bits is indicated by the absence of a pulse.

2. A system for decoding a digital phase modulated signal including a serial train of binary signal bits in which each one type of signal bit is in a first state for the first half of its bit interval and in a second state for the second half of its bit interval while each zero type of signal bit is in the second state for the first half of its bit interval and in the first state for the second half of its bit interval, said binary signal bits being arranged in groups of an arbitrary length with succeeding groups being separated by a separation code interval including a uniquely extending portion during which said phase modulated signal remains in one of said states, comprising, in combination, means responsive to said phase modulated signal to produce a first pulse train including a pulse for each transition between said first and second states in said phase modulated signal, means responsive to said first pulse train to produce a first reference signal phased according to the mid-bit transitions in said binary signal bits, means responsive only to said separation code interval to produce a second reference signal, means for comparing said first reference signal, said second reference signal, and said digital phase modulated signal to produce an output pulse train in which the reception of each of said one type of signal bits in said groups is indicated by a pulse and the reception of each of said zero type of signal bits is indicated by the absence of a pulse, and means responsive to said first pulse train, said first reference signal, and said second reference signal to produce an output pulse upon the omission of a transition between said first and second states at the middle of a received binary signal bit in said groups.

3. In combination, a source of a digital phase modulated signal including a serial train of binary signal bits in which each one type of signal bit is in a first state for the first half of its bit interval and in a second state for the second half of its bit interval while each zero type of signal bit is in the second state for the first half of its bit interval and in the first state for the second half of its bit interval, said signal bits being arranged in groups of an arbitrary length with succeeding groups being separated by a separation code having an interval including a uniquely extending portion during which said phase modulated signal remains in one of said states, means responsive to said phase modulated signal to produce a first reference signal phased according to the mid-bit transitions in said binary signal bits, means including an integrating-threshold amplifier responsive to said separation code to produce a second reference signal, and means for comparing said first reference signal, said second reference signal, and said digital phase modulated signal to produce an output pulse train in which the reception of each of said one type of signal bits in said groups is indicated by a pulse and the reception of each of said zero type of signal bits is indicated by the absence of a pulse.

4. In combination, a source of a digital signal including a serial train of binary signal bits in which each one type of signal bit is in a first state for the first half of its bit interval and in a second state for the second half of its bit interval while each zero type of signal bit is in the second state for the first half of its bit interval and in the first state for the second half of its bit interval, said signal bits being arranged in groups of an arbitrary length with succeeding groups being separated by a separation code interval including a uniquely extending portion during which said digital signal remains in one of said states with transitions between said first and second states occurring only at times corresponding to the middle of said binary signal bit intervals, means responsive to said digital signal to produce a first reference signal phased according to the mid-bit transitions in said binary signal bits, means including an amplifier having a time constant greater than the duration of said bit intervals but less than the duration of said extended portion responsive only to said uniquely extending portion of said separation code interval to produce a second reference signal, and means responsive to said first reference signal, said second reference signal, and said digital signal to produce an output pulse train in which the reception of each of said one type of signal bits in said groups is indicated by a pulse and the reception of each of said zero type of signal bits is indicated by the absence of a pulse.

5. In combination, a source of a digital phase modulated signal including a serial train of binary signal bits in which each one type of signal bit is in a first state for the first half of its bit interval and in a second state for the second half of its bit interval while each zero type of signal bit is in the second state for the first half of its bit interval and in the first state for the second half of its bit interval, said signal bits being arranged in groups of an arbitrary length with succeeding groups being separated by a separation code interval including a uniquely extending portion during which said phase modulated signal remains in one of said states with transitions between said first and second states occurring only at times corresponding to the middle of said binary signal bit intervals, means responsive to said phase modulated signal to produce a first pulse train including a pulse for each transition between said first and second states in said phase modulated signal, means responsive to said first pulse train to produce a first reference signal phased according to the mid-bit transitions in said binary signal bits, means having a time constant greater than the duration of said bit intervals but less than the duration of said extended portion responsive only to said uniquely extending portion of said separation code interval to produce a second reference signal, means responsive to said first reference signal, said second reference signal, and said digital phase modulated signal to produce an output pulse train in which the reception of each of said one type of signal bits in said groups is indicated by a pulse and the reception of each of said zero type of signal bits is indicated by the absence of a pulse, and means responsive to said first pulse train, said first reference signal, and said second reference signal to produce an output pulse upon the omission of a transition between said first and second states at the middle of a received binary signal bit in said groups.

6. A system for decoding a digital phase modulated signal including a serial train of binary signal bits in which each one type of signal bit is in a first state for the first half of its bit interval and in a second state for the second half of its bit interval while each zero type of signal bit is in the second state for the first half of its bit interval and in the first state for the second half of its bit interval, said binary signal bits being arranged in groups with succeeding groups being separated by a separation code interval including a uniquely extending portion during which said phase modulated signal remains in one of said states with transitions between said first and second states occurring only at times corresponding to the middle of said binary signal bit intervals, comprising, in combination, means responsive to said phase modulated signal to produce a first pulse train including a pulse for each transition between said first and second states in said phase modulated signal, means responsive only to the pulses in said first pulse train occurring at the times of the mid-bit transitions in said binary signal bits to produce a reference signal phased according to said mid-bit transitions, means having a time constant greater than the duration of said bit intervals but less than the duration of said extended portion responsive only to said extended portion of said separation code interval to produce a control signal, means responsive to said reference signal, said control signal, and said digital phase modulated signal to produce an output pulse train in which the reception of each of said one type of signal bits in said groups is indicated by a pulse and the reception of each of said zero type of signal bits is indicated by the absence of a pulse, and means responsive to said first pulse train, said reference signal, and said control signal to produce an output pulse upon the omission of a transition between said first and second states at the middle of a received binary signal bit in said groups.

7. A system for decoding a digital phase modulated signal including a serial train of binary signal bits in which each one type of signal bit is in a first state for the first half of its bit interval and in a second state for the second half of its bit interval while each zero type of signal bit is in the second state for the first half of its bit interval and in the first state for the second half of its bit interval, said binary signal bits being arranged in groups with succeeding groups being separated by a separation code interval including a uniquely extending portion during which said phase modulated signal remains in one of said states with transitions between said first and second states occurring only at times corresponding to the middle of said binary signal bit intervals, comprising, in combination, means responsive to said phase modulated signal to produce a first reference signal phased according to the mid-bit transitions in said binary signal bits, means including an amplifier having a time constant greater than the duration of said bit intervals but less than the duration of said extended portion responsive only to said extended portion of said separation code interval to produce a second reference signal, and means for comparing said first reference signal, said second reference signal, and said phase modulated signal to produce an output pulse train in which the reception of each of said one type of signal bits in said groups is indicated by a pulse and the reception of each of said zero type of signal bits is indicated by the absence of a pulse.

8. In combination, a source of a digital phase modulated signal including a serial train of binary signal bits in which each one type of signal bit is in a first state for the first half of its bit interval and in a second state for the second half of its bit interval while each zero type of signal bit is in the second state for the first half of its bit interval and in the first state for the second half of its bit interval, said signal bits being arranged in groups of an arbitrary length with succeeding groups being separated by a separation code interval including in order a binary zero bit interval, two bit intervals forming an extended portion during which said phase modulated signal remains in said first state, a binary one bit interval, a binary zero bit interval and a binary one bit interval so that all transitions between said first and second states in said separation code interval occur only at the middle of binary signal bit intervals, means responsive to said phase modulated signal to produce a first reference signal phased according to the mid-bit transitions in said binary signal bits, means including an amplifier having a time constant greater than the duration of said bit intervals but less than the duration of said extended portion responsive only to said extended portion of said separation code interval to produce a second reference signal, and means responsive to said first reference signal, said second reference signal, and said digital phase modulated signal to produce an output pulse train in which the reception of each of said one type of signal bits in said groups is indicated by a pulse and the reception of each of said zero type of signal bits is indicated by the absence of a pulse.

9. In combination, a source of a digital phase modulated signal including a serial train of binary signal bits in which each one type of signal bit is in a first state for the first half of its bit interval T and in a second state for the second half of its bit interval T while each zero type of signal bit is in the second state for the first half of its bit interval T and in the first state for the second half of its bit interval T where T is the duration of each bit interval, said binary signal bits being arranged in groups with succeeding groups being separated by a separation code interval including a uniquely extending portion equal to 3.00T during which said phase modulated signal remains in one of said states with transitions between said first and second states occurring only at times corresponding to the middle of said binary signal bit intervals, means responsive to said phase modulated signal to produce a first pulse train including a pulse for each transition between said first and second states in said phase modulated signal, means including a monostable multivibrator having a time constant equal to 0.75T responsive only to the pulses in said first pulse train occurring at the times of the mid-bit transitions in said binary signal bits to produce a reference signal phased according to said mid-bit transitions, means including an integrating-threshold amplifier having a time constant equal to 2.50T and responsive only to said extended portion of said separation code interval to produce a control signal, means responsive to said reference signal, said control signal, and said digital phase modulated signal to produce an output pulse train in which the reception of each of said one type of signal bits in said groups is indicated by a pulse and the reception of each of said zero type of signal bits is indicated by the absense of a pulse, and means including a second integrating-threshold amplifier having a time constant equal to 0.50T responsive to said first pulse train, said reference signal, and said control signal to produce an output pulse upon the omission of a transition between said first and second states at the middle of a received binary signal bit in said groups.

10. In combination, a source of a digital phase modulated signal including a serial train of binary signal bits in which each one type of signal bit is in a first state for the first half of its bit interval T and in a second state for the second half of its bit interval T while each zero type of signal bit is in the second state for the first half of its bit interval T and in the first state for the second half of its bit interval T where T is the duration of each bit interval, said binary signal bits being arranged in groups with succeeding groups being separated by a separation code interval including a uniquely extending portion equal to 3.00T during which said phase modulated signal remains in one of said states with transitions between said first and second states occurring only at times corresponding to the middle of said binary signal bit intervals, means responsive to said phase modulated signal to produce a first pulse train including a pulse for each transition between said first and second states in said phase modulated signal, means including a monostable multivibrator having a time constant equal to 0.75T responsive only to the pulses in said first pulse train occurring at the times of the mid-bit transitions in said binary signal bits to produce a reference signal phased according to said mid-bit transitions, means including an integrating-threshold amplifier having a time constant equal to 2.50T and responsive only to said extended portion of said separation code interval to produce a control signal, means responsive to said reference signal, said control signal, and said digital phase modulated signal to produce an output pulse train in which the reception of each of said one type of signal bits in said groups is indicated by a pulse and the reception of each of said zero type of signal bits is indicated by the absence of a pulse, means including a second integrating-threshold amplifier having a time constant equal to 0.50T responsive to said first pulse train, said reference signal, and said control signal to produce an output pulse upon the omission of a transition between said first and second states at the middle of a received binary signal bit in said groups, and a third integrating-threshold amplifier having a time constant equal to 3.25T responsive only to said reference signal to produce an output signal upon said phase modulated signal remaining in one of said states for a period longer than 4.00T.

No references cited.